3,177,161
EXPANDED METALLIC AND CERAMIC BODIES
Robert Smith-Johannsen, Niskayuna, N.Y., assignor to Chemgene Corporation, Mineola, N.Y., a corporation of New York
No Drawing. Filed June 19, 1961, Ser. No. 117,788
14 Claims. (Cl. 252—502)

This invention relates to expanded metallic and ceramic bodies and to the process of making the same. The novel expanded metallic and ceramic bodies are formed according to this invention by coprecipitating a freeze-sensitive colloidal silica and an inorganic silicophilic material from an aqueous dispersion by freezing the aqueous dispersion. The expanded metallic and ceramic bodies of this invention are useful for many different purposes and can have widely varying properties. The particular use to which the expanded metallic and ceramic bodies would be most suitable will depend mainly on the type and amount of the inorganic silicophilic material coprecipitated with the colloidal silica and the manner by which it is coprecipitated. For example, the expanded metallic and ceramic bodies of this invention can be used as refractory materials, battery separators, filters, and for numerous electronic applications such as voltage regulators, amplifiers, resistors, and electrically conductive bodies.

The usual technique in bonding, forming, or casting materials involves the use of heat and pressure. According to this invention, the bonding, forming, or casting is the result of a novel bonding and stabilizing effect caused by the coprecipitation of a freeze-sensitive colloidal silica and an inorganic silicophilic material from an aqueous dispersion under the influence of the freezing of the aqueous phase in which they are dispersed.

When such freeze-sensitive aqueous colloidal silica dispersions are frozen in the presence of an inorganic silicophilic material, a strong bonding takes place which permits the coprecipitated materials to be formed or cast into practically any type of structure desired. The type of structure formed can be varied from a highly porous structure with flexibility to highly dense and rigid structures and can either be micro- or macroporous.

Various types of inorganic silicophilic materials can be used according to this invention to produce the metallic and ceramic bodies. An inorganic silicophilic material is one which has a natural affinity for silica particles present in freeze sensitive silica dispersions after undergoing freezing in admixture with the silica particles or in which a strong bond takes place between the silica particles and the silicophilic material as a result of the freezing. Laminar or flake-like materials have a natural affinity for the silica particles present in freeze-sensitive silica dispersions after undergoing freezing together with the silica particles. Inorganic laminar or flake-like materials are particularly advantageous. Some examples of laminar or flake-like materials which can be used according to this invention include mica, graphite, and molybdenum disulfide. Powders of metals which readily form insoluble silicates are also particularly advantageous inorganic silicophilic materials. Examples of silicophilic metal powders which readily form insoluble silicates are zinc, aluminum, and nickel. Clays such as china clay and Norwegian clay can also be used as a silicophilic material. Various mixtures of the silicophilic materials can also be used. The size of the flake-like materials does not appear to be critical. I have used flakes having a diameter of ⅛ inch as well as flakes which were microscopic.

Various aqueous silica dispersions can be used to form the expanded or porous bodies according to this invention so long as the silica dispersion is freeze-sensitive. A freeze-sensitive silica dispersion is a silica dispersion in which the silica particles are precipitated or coagulated when the dispersion is frozen. Such precipitation is irreversible and the silica particles cannot, for practical purposes, be redispersed and which would ordinarily render them worthless for the uses for which they were originally intended.

Freeze-sensitive aqueous silica dispersions which can be used according to this invention include aqueous colloidal silica dispersions of the type marketed under the trade name "Ludox" by E. I. du Pont de Nemours & Co. and a similar freeze-sensitive aqueous silica dispersion marketed under the trade name "Syton" by Monsanto Chemical Company. Ludox colloidal silicas and methods of making them are described in detail in United States Patents Nos. 2,244,325, issued June 3, 1941; 2,574,902, issued November 13, 1951; and 2,597,872, issued May 27, 1952.

As described in these patents, Ludox colloidal silica is a stable aqueous silica sol generally having a silica-alkali ratio from about 60:1 to 130:1 containing discrete silica particles having a molecular weight as determined by light scattering of more than one-half million. Ludox silica generally has a relative viscosity at 10 percent $SiO_2$ from 1.15 to 1.55 and generally contains 20 to 35 percent by weight $SiO_2$.

The silica-alkali ratio of the Ludox silica is calculated as $Na_2O$ and may be as low as 10:1, but it is advantageous to use a Ludox silica containing a silica-alkali ratio of between 60:1 to 130:1. The silica-alkali ratio makes it obvious that the silica and alkali are combined in a different manner not found in conventional metal alkali silicates since the latter cannot be prepared in a form soluble and stable in aqueous dispersions at ratios in excess of 4:1. The alkali present in Ludox silica is not uniformly distributed throughout the $SiO_2$ particles as it is in the conventional silicates such as water glass but is substantially all outside the $SiO_2$ particles. The Ludox silica sols could be prepared and used in the absence of alkali, but this is not practical because they gel up very rapidly in the absence of alkali, presenting serious process and storage problems.

Ludox colloidal silicas are generally prepared by passing a silicate through an ion exchange resin to remove the alkali as described in United States Patent No. 2,244,-325. Generally all the alkali is not removed by the ion exchange resin to maintain the stability of the resulting sol. If all of the alkali is removed from the silicate, the resulting sols are not stable but they can be stabilized by adding small amounts of alkali such as $Na_2O$ or $K_2O$.

It is advantageous to use an aqueous silica dispersion having a silica particle size of less than 30 millimicrons (0.03 micron) although the particle size of the silica may be of other various colloidal dimensions. The particle size of Ludox colloidal silica is determined as the average size of the particles present when the solution is diluted to about 0.1 percent $SiO_2$ with water and dried in a very thin layer deposit as described in the above-mentioned patents.

It is also advantageous to use an aqueous silica dispersion containing between about 29 to 30 percent $SiO_2$ although higher and lower amounts can be used. Suitable silica sols containing 5 to 15 percent $SiO_2$ can be prepared according to the United States Patent No. 2,244,325 while the more advantageous Ludox silica sols containing 20 to 35 percent by weight $SiO_2$ can be prepared according to the United States Patent No. 2,574,902.

A type of Ludox colloidal silica readily available on the market and which can advantageously be used according to this invention is composed of 29 to 31 percent $SiO_2$, 0.29 to 0.39 percent $Na_2O$, and a maximum of 0.15 percent sulfate as $Na_2SO_4$, and the remainder water. In this readily available Ludox colloidal silica the silica particles range from about 0.01 to 0.03 micron.

Various other types of silica dispersions can also be used according to this invention provided they are freeze-sensitive or can be rendered freeze-sensitive. As described in my copending application Serial No. 634,821, filed January 18, 1957, now United States Patent No. 2,991,-257, there are available different types of silica which are not freeze-sensitive and which cannot ordinarily be used to form the expanded or porous bodies and compositions of this invention. Examples of such types of non-freeze-sensitive silicas are dihydrated silica gel such as silica aerogel marketed by the Monsanto Chemical Company under the trade name "Santocel," vapor phase fumed silica, and silica particles resulting from the hydrolysis of esters of silicic acid such as alkyl or aryl orthosilicates.

These normally non-freeze-sensitive silicas can be rendered freeze-sensitive by contaminating the non-freeze-sensitive silica particles with a fresh silica deposit by adsorption from a freeze-sensitive silica sol or by the deposition of fresh silica on the non-freeze-sensitive silica particle surfaces as described in the copending application Serial No. 634,821.

In order to form the bodies according to this invention, it is first necessary to form a dispersion of the freeze-sensitive colloidal silica together with the silicophilic material. Aqueous dispersions have been found to be advantageous. This can readily be accomplished by first forming the freeze-sensitive silica aqueous dispersion and then thoroughly mixing therewith the silicophilic material. The silicophilic material should be thoroughly and evenly dispersed throughout the silica dispersion. This can be accomplished in most instances by stirring in the silicophilic material by hand. In some instances the natural affinity between the silicophilic particles and the silica makes it quite difficult to completely and evenly disperse the silicophilic material throughout the silica dispersion by simple mixing, and in such cases agitation in a high speed mixer, such as a homomixer or a Waring Blendor is helpful.

The relative proportions of the inorganic silicophilic materials to the freeze-sensitive silica particles can be varied over a fairly wide range. It is preferred to start with an aqueous silica dispersion containing about 30 percent solids or silica and the remainder water. To this freeze-sensitive silica dispersion various amounts of the silicophilic materials can be added. The particular amounts used will depend largely upon the properties desired in the resulting structure. For example, when using zinc dust as a silicophilic material for the purpose of forming electrically conductive compositions, the zinc dust should be present in an amount in excess of that which would normally react with the silica present to form a zinc silicate.

The amount of silicophilic materials which can be utilized would, of course, be that which would be sufficient to effect a bonding by freezing and thawing the dispersion according to this invention. This amount will also vary depending upon the particle size distribution of the silicophilic material, the shape of the silicophilic material as well as the particular silicophilic material being utilized, and the pore volume desired.

The next step in forming the bodies of this invention involves the freezing of the silicophilic material-silica sol. The frozen sol forms a rigid ice-like structure. When this ice-like structure is thawed it generally forms a fairly rigid structure somewhat like a sponge. The water formed upon thawing can be easily drained out of the resulting body and any remaining water evaporated to dryness. The thawing and drying of the bodies do not effect their dimensions.

The properties of all of the bodies produced according to this invention can be varied greatly depending to a large extent upon the property of the inorganic silicophilic materials from which they are produced. For example, mica produces dielectric properties; graphite, semi-conducting properties; zinc, conducting and electrolytic properties; and molybdenum disulfide, lubricating properties. In each case these properties introduced by the use of the various inorganic silicophilic materials are superimposed on the effect of the basic porosities and orientations induced by the freezing process. Because of the combination of these properties, it is possible to fabricate a great many bodies having widely different properties.

Although the freezing step utilized in producing the bodies of this invention is a relatively simple one, there are many process factors which influence the ultimate properties of the resulting bodies. Process factors which influence the ultimate properties of the resulting bodies include the rate of freezing, the attitude and shape of the freezing surface, the proportion of the water in the mixture or dispersion, the presence or absence of agitation and the type of agitation or vibration utilized during the freezing, the temperature of the freezing surface, the minimum temperature attained by the frozen structure, and the presence, number, and relative effectiveness of freezing nuclei. In some instances where it is advantageous to bake the body after it has been frozen, thawed and dried, the final baking temperature also will affect the ultimate properties of the resulting bodies.

In considering the various process factors which affect the ultimate properties of the resulting bodies, it should be borne in mind that the process factors are not necessarily independent, and it is thus not possible to make any specific statements concerning the properties resulting from the use of a particular process step except with respect to a very specific silicophilic material-silica sol and where other process factors are maintained fairly constant. Variations in process factors to produce different properties in the resulting bodies of this invention can be determined by routine experiments by those skilled in the art. The following discussion of the various process factors thus assumes that other process factors remain fairly constant and that the proportions of the materials in the aqueous dispersion and the structures of the silicophilic materials also remain fairly constant.

The silicophilic material-silica dispersions can be frozen in any desired shape, form, or size. They can also be frozen, thawed, and broken down before drying into a pastelike consistency, and reformed into any desired shape, form, or size. When broken down and dried, a similar bonding of the silica and silicophilic particles results as when the dispersions are not broken down. They still retain porosity which is not destroyed by the breaking-down procedure.

The frozen, thawed, and still wet structure can be broken down by subjection to sufficient pressure to produce a material of moldable or coatable consistency, such as by passing the structure through a two-roll rubber mill operating at differential speeds having a wide spacing. A shearing force or action to break down the thawed structures is more advantageous rather than a compression action.

The dispersions can also be frozen between or around structures. For example, they can be frozen between glass mats or asbestos sheets or around objects such as metal sheets, grids, bars, or similar organic resinous objects after they have been thawed and before they have been dried, and dried thereon to form composite structures.

One manner of freezing the silicophilic material-silica dispersions is in the form of a pancake. This can be accomplished by taking a flat metallic plate or sheet, such as steel or aluminum, and bringing the plate down to the chosen freezing temperature, such as to between about 0° F. and −20° F. The dispersion can then be poured directly upon the plate. In this manner the dispersion is frozen almost instantaneously and forms into a pancake-like structure.

The plates or other freezing devices can be cooled in any manner desired such as in a deep freeze or by circulating a cooling liquid contained in pipes within the plate. It is advantageous to use a very thin, hard, flexible, stainless steel plate since the frozen cakes can be more easily removed therefrom by merely tapping the steel plate.

The dispersion can also be frozen in suitable molds directly into the desired shape such as solid or hollow cylinders or curved shapes such as domes, balls, etc.

Refrigerant substances which can be used include Dry Ice and acetone, liquid air, Freon gas, etc.

The particular surface upon which the dispersions are frozen has been found to have a profound influence upon the type of product formed and its control is of importance to the porosity, orientation, and quality of the final product. If a surface is provided with relatively few freezing nuclei, fairly large ice crystals are formed which results in the formation of structures of higher porosity in that the pores are generally quite large and at times are not particularly uniform. This is true since the ceramic structure formed by the freezing process generally corresponds to the formation of the ice crystals. Generally as the number of freezing nuclei present on the freezing surface is increased, the pores of the resulting structure become smaller and more uniform; and as the effectiveness of the freezing nuclei is increased, the pores of the resulting structure also become smaller and more uniform.

The surfaces upon which the dispersions can be frozen can be nucleated in various manners such as by wiping the surface with a suitable cloth, e.g., cotton or wool, or by forming a silver iodide or silicone coating on the freezing surface.

The use of a silicone freezing surface is particularly advantageous. The freezing of the dispersion on a silicone surface more readily results in the formation of needlelike or threadlike ice crystals. In addition, the use of a silicone freezing surface results in the formation of a different type structure since the ice crystals grow out from the freezing surface on the crystal axis which normally grows along the surface. Crystals are thus formed both perpendicular to and parallel to the silicone freezing surface.

The silicone surface may be a silicone resin or a silicone rubber. Various silicone resins and rubbers well known in the art can be used such as polydimethylsiloxane and partially phenyl substituted polydimethylsiloxane resins and rubbers. A silicone freezing surface can also be formed by applying a suitable silicone oil to the surface in a thin film. Films of silicone oil can be applied most readily by wiping the freezing surface with a cloth contaminated with the silicone oil. Various well-known silicone oils can be used for this purpose, and polydimethylsiloxane oils or partially substituted phenyl derivatives thereof are most advantageous. A silicone oil-treated surface is superior to the silicone resin or rubber surface since the silicone oils are more pure and uncontaminated by curing agents, fillers, etc.

The rate of freezing can also be employed to vary the properties of the resulting structures of this invention. Generally slow freezing causes a high degree of orientation of the silica and silicophilic particles and also quite an open or highly porous structure. Very fast freezing results in a very fine, almost microporous structure and little or no orientation of the silica and silicophilic particles. The rate of freezing can vary from an almost instantaneous freeze to a freezing period of several minutes or more. The length of time utilized for freezing the dispersions of this invention cannot be stated in exact terms. It can be said, however, that the dispersion should not be frozen too slowly. A very slow freeze causes the formation of large ice crystals in the dispersion and will either prevent or produce a very weak bond between the particle agglomerates in the dispersion. Some dispersions can withstand a longer freezing step than others. The length of the freezing step which can be used depends upon a number of factors including the relative proportions of the silicophilic particles to the silica particles, the proportion of the water in the dispersion, the particle size and shape of the silicophilic material, the temperature of the freezing surface, the presence of wetting of dispersing agents, and so forth. The orientation of the particles desired will also play a part in determining the rate of freezing.

The manner of freezing the dispersions in conjunction with the thickness in size of the dispersion being frozen is also important. In order to freeze the aqueous dispersions they are generally contacted against a freezing surface. That portion of the dispersion closest the freezing surface freezes first, while that farthest from the surface freezes last. As the thickness of the dispersion is increased, it takes longer and longer for that portion farthest away from the freezing surface to freeze. If the dispersion frozen is too thick under the freezing conditions used it freezes too slowly on the outside and renders that portion of the frozen cake undesirable or even useless. Generally, thicker dispersions can be frozen with the use of lower temperatures and vice versa. When using a freezing temperature at about 20° C. below the freezing point of the dispersion it is advantageous to maintain the thickness of the dispersion to within about ⅛ of an inch. Larger amounts of dispersions can be frozen by inserting a series of freezing plates into a bulk dispersion at appropriate intervals provided care is taken to maintain the proper surface conditions between each cycle.

Various temperatures can be used to freeze the dispersions so long as the temperature used is sufficiently low to freeze the dispersion within a reasonable time. Most of the dispersions I have used have possessed a freezing point of about 0° C. As the water content of the dispersions is increased and also as the freezing point lowering effect of the water soluble portion of the dispersions is increased lower temperatures will be required to achieve the desired bond. I have frozen dispersions from between the freezing point of the dispersion to about 20° C. below their freezing points. I prefer, however, to use a surface freezing temperature of about 20° C., below the freezing point of the dispersion. Immediately after the dispersion has frozen or solidified, the temperature of the frozen cake is only about 0° C. and has not yet reached the temperature of the plate. It is important to maintain the frozen cake at the low temperature long enough to become uniformly cold and to freeze out a maximum of water from the system thereby forcing the particles into intimate contact which results in complete coagulation in the desired interparticle bond.

The proportion of water to the solids content of the dispersion will also affect the properties of the resulting bodies. Generally, as the proportion of water is increased, the resulting bodies become more porous and vice versa. There should be sufficient solids present in the dispersion so that they will touch when forced together by the formation of the ice crystals and form a structure or connected body. The presence of too much water or too little solids will not permit the contacting of a significant number of particles to form a bond sufficiently strong to be useful. As the proportion of water is increased, it is also advantageous to freeze the dispersions at lower temperatures and at a faster rate. I have frozen dispersions varying from about 35 to 65 percent solids.

Orientation and the amount and type thereof affect the ultimate properties of the resulting bodies. Bodies can be produced according to this invention varying from those which do not have oriented particles or in which the particles are more or less randomly distributed to those which are highly oriented. The types of properties imparted to the bodies by orientation depend largely upon the particular silicophilic material used. Generally, as the orientation is increased, the properties imparted to the structures by the silicophilic materials are enhanced. For example, as mica introduces dielectric properties, the dielectric constants of the mica-silica bodies are increased as the orientation is increased. The dielectric constant of highly oriented mica-silica bodies is far above that which would normally be expected from such a body. In this manner the dielectric properties of bodies containing silicophilic materials which would impart dielectric properties thereto can be controlled by controlling the amount and type, of orientation.

When using a silicophilic material which imparts semiconductive or conductive properties such as graphite and zinc, orientation can control the conductive properties. For example, graphite-silica bodies which are not oriented or in which the particles are randomly distributed will possess substantially the same conductivity in all directions while oriented graphite-silica bodies will possess higher conductivity in one direction than in another. The amount of difference in conductivity in different directions will depend largely upon the amount and type of orientation.

Orientation comes naturally due to the influence of gravity in the freezing of the dispersions. The dispersed particles align themselves under the influence of gravity and when frozen maintain that alignment unless it is changed in some manner.

Various factors which influence the orientation, such as the rate of freezing, have been previously discussed. Other factors include the attitude of the freezing surface and agitation.

The orientation of the particles can also be controlled to obtain different effects by controlling the attitude of the freezing surface. For example, if the dispersions are frozen in a cylindrical hole drilled inside a copper block by maintaining the copper block at a temperature below the freezing point of the dispersion and placing the dispersion therein, the formation of the ice crystals takes place at right angles to the walls of the cylinder. At the same time the flake- or laminar-like silicophilic materials settle and orient themselves due to gravity in a plane perpendicular to the walls of the cylinder. In this manner the crystal growth and plane of the silicophilic materials are in the same plane.

If the same copper block containing the cylinder is tilted, for example 30° from the horizontal, the ice crystals will still form at right angles to the cylinder walls, but the flakes will settle and orient themselves in a different plane from which the ice crystals are growing.

If orientation is a property desired, it is not desirable to break down the frozen and thawed structure since breaking down of the structures which have been frozen in an oriented manner tends to disrupt the orientation.

Agitation of the dispersions, such as vibration, while they are being frozen disrupts the orientation of the particles. Extensive agitation can be used as a means of forming unoriented bodies. In order to produce highly oriented bodies, the dispersions should be disturbed as little as possible during the freezing step.

Agitation will occur to some extent as a result of pouring the dispersion into a mold, but orientation can still occur if the rate of freezing is sufficiently slow. It is possible to avoid this type of agitation by pouring the dispersion into a mold and allowing it to stand until gravity orientation has been completed and then dipping the mold into a refrigerant substance or pouring the refrigerant substance around the mold.

Various inert fillers can be incorporated into the resulting metallic and ceramic structures, either directly to the dispersions before they are frozen, or after they have been thawed and before they have been dried, in addition to the silica and silicophilic materials to alter the properties of the resulting bodies. The addition of glass, asbestos, cellulose, mineral, or metal fibers for example, produces a reinforcing effect. Other inert fillers can also be used as will be apparent to those skilled in the art.

The amount of filler which can be used is not critical. The amount should not be sufficiently high however so as to weaken or significantly disrupt the bonding of the silica and silicophilic materials. If added directly to the dispersions, the filler should be in an amount so as not to adversely interfere with the freezing steps in obtaining the desired properties.

The resulting ceramic and metallic structures, because of their porosity, can also be impregnated with various organic and inorganic substances. Zinc or aluminum phosphate, for example, can be used as an inorganic impregnant.

Some examples of organic substances which can be used as impregnants include phenolic resins such as phenolformaldehyde, silicone resins such as hydrolyzed mixtures of mono-, di-, and trichlorosilanes, vinyl resins such as polyvinyl chloride, polyvinyl acetate, polystyrene, polyethylene and other various well-known resinous materials such as melamine and epoxy resins.

The porous structures formed according to this invention are independent of the impregnant. If impregnant is removed therefrom by burning it out or by a solvent for example, the original properties of the body are not affected nor are the original bonds formed therein between the silica and silicophilic material adversely affected. If a graphite-silica body is impregnated with a phenolic resin and operated as a heating element at temperatures which will burn out the phenolic resin, the resin will be removed therefrom without affecting the other properties and the body could be reimpregnated if desired.

To thaw the frozen cakes it is only necessary to permit them to stand at room temperature until the body reaches a temperature above its freezing point. Thawing can be hastened to some extent by increasing the thawing temperature, but it is advantageous to thaw the frozen cakes slowly by permitting them to stand at room temperature without agitation or significantly disturbing them in any manner.

The bodies formed according to this invention can also be readily and easily freed from ions by the simple expedient of washing them with deionized water before they are dried. This is an important property since freedom from ions in materials to be used in electronic applications is highly desirable.

The invention is further described in more detail below as it specifically applies to three representative silicophilic materials; namely, mica, a dielectric; graphite, a semiconductor; and zinc, a conductor.

MICA

Mica flakes are extremely fine laminations of mineral matter resembling a powder, and the mica flakes are sometimes referred to as a powder. The degree of subdivision or cleavage of the mica flakes will determine to some extent the particle size and shape of the mica flakes. There is also an affinity between the mica flakes and the silica particles which makes it difficult to disperse the mica flakes completely and evenly throughout the silica sol. By agitating the mica-silica sol in a high speed mixer such as a homomixer or Waring Blendor, all loose bonds are broken up and the mica flakes becomes completely coated with the silica of the silica sol. This results in a much stronger and more uniform structure after the mixture has been frozen and thawed than when no high speed mixer is used. This is especially so when relatively large flakes of mica are used.

When an aqueous mixture of mica flakes and silica is frozen before it is dried down, the resulting structure not only becomes highly porous but retains its stability and rigidity on soaking in water or acid. After the structure has been formed by freezing, it can also be broken up by passing it through differential rolls of a two-roll rubber mill and reformed before it is dried, and the resulting structure still retains its porosity, rigidity, and stability to water and acids. This demonstrates that a novel bonding effect results due to the freezing which is not obtained by simple drying or baking.

Mica is a dielectric and introduces dielectric properties into porous and expanded bodies produced according to this invention. These dielectric properties can also be controlled not only by varying the amounts of mica in the body but by varying the freezing procedures as discussed above. Higher orientation results in higher dielectric constants. The mica-silica bodies have usually high dielectric constants at low frequencies.

As with the other bodies produced according to this invention, the mica-silica bodies can be impregnated with various organic or inorganic impregnants. By using suitable impregnants such as silicone resins and tetrafluorethylene resins, bodies can be produced having the novel combination of properties of low power loss, high dielectric strength, and a high dielectric constant. For example, the tetrafluorethylene (Teflon) can be introduced in the dispersion before freezing and the resin sintered after the body is formed and dried.

The mica-silica structures, because of their high strength, high temperature stability, low shrinkage, and low thermal conductivity, are broadly useful in the field of thermal insulation. Further, since the mica-silica structures are made of materials which are relatively pure, they contain no so-called carburization catalysts which are the cause of spalling in inert or reducing atmospheres in most refractory materials. The mica-silica structures are also useful as filters such as cigarette and air conditioning filters, battery separators, radome sandwich structures, etc.

The proportion of mica to silica used in forming the silica-mica structures is not critical. If a silica sol such as Ludox is frozen by itself, a crumbly mass is formed, but when mica is mixed therewith in a sufficient amount and it is frozen and thawed, a fairly hard, strong structure or cake is formed. The amount of mica should, therefore, be sufficient to form a strong cake when frozen and thawed with the silica sol. Similarly the maximum amount of mica is not critical, and if too much mica is employed no structure or cake is formed and sufficient silica should be present so that a solid structure is formed upon freezing and thawing. It is advantageous to maintain the mica-silica ratio between about 1:3 to 10:3 on a dry basis. In other words, when using a silica sol containing about 30 percent SiO, the proportions can be varied between about one part by weight mica for every 10 parts by weight of the silica sol to about 10 parts by weight mica to one part by weight of the silica sol.

GRAPHITE

Graphite is available in various forms of subdivision, but in each case it is laminar- and flake-lke even though it resembles a powder. Some forms of graphite available commercially include those referred to as colloidal or semi-colloidal graphite, graphite powder, graphite flakes, and Acheson graphite. Although the various forms of graphite can be used, Acheson graphite is preferred because of its high conductivity and high purity.

Graphite is a semi-conductor and introduces semi-conducting properties into the bodies. The conductivity and type of conductivity can be varied by varying the amount of graphite present in the original dispersion and also the freezing process as explained above.

The proportion of graphite can be varied quite widely. The amount should be sufficient to form a cake and a strong, solid, porous body when thawed and dried. Electrical properties generally desired in semi-conductors can be obtained by using between about 30 to 50 percent graphite based on the total solid content of the silica and graphite. I have used graphite in amounts of about 60 percent and 25 percent to obtain variable semi-conducting properties. The concentration of graphite can fall outside the above, however, depending upon the degree of conductivity desired and the presence of other materials in the dispersions such as clays, metal oxides, cellulose, asbestos, and glass fibers, etc. When using other semi-conducting materials such as molybdenum disilicide, the proportions necessary to obtain the desired conductivity or resistance will necessarily vary.

The graphite-silica bodies being porous can also be impregnated with the various impregnants herein disclosed. Impregnation of the graphite-silica bodies imparts greater strength thereto and when formed into the shape of a cylinder or bar can easily be sliced into wafers which can be substituted for a carbon wafer in a carbon-pile voltage regulator.

ZINC

In the formation of the porous bodies with a metal powder capable of forming an insoluble silicate with the silica particles such as zinc, the invention includes an additional step involving what appears to be a chemical reaction in addition to the physical formation of the porous bodies by freezing and thawing.

It is advantageous to use a very finely divided metal powder such as zinc dust, since it becomes increasingly more difficult to form the conductive bodies of this invention as the particle size increases.

When a zinc dust-silica dispersion is frozen, thawed, and dried, the resulting body is rigid and porous, but it is not conductive. The porous body can be rendered conductive by firing it at about 1000° F. as is taught in my copending application Serial No. 530,426, filed August 24, 1955, now United States Patent No. 2,891,228. The particular firing temperature and the time of firing required to render the body conductive will depend mainly on the amount of alkali present during the firing as is disclosed in the above-noted application.

These zinc bodies can be either conducting or semi-conducting depending upon the amount of zinc employed. As the amount of zinc is increased, the conductivity correspondingly increases.

The fired porous zinc conducting bodies actually consist of continuous paths of zinc metal in a zinc silicate and zinc oxide sponge since the zinc and silica react with oxygen during the firing to form zinc silicate and zinc oxide with the excess zinc being left as free zinc difused throughout the structure. Although metallic zinc is soluble in aqueous alkali, the zinc silicate bodies are unaffected by alkali although they show the electrolytic zinc action and thus must contain free zinc. This makes possible a rechargeable zinc plate for a silver-zinc battery cell.

The zinc-silica bodies can be accurately cast by the process of this invention either during the freezing or after they have been thawed and before they have been dried. Resistors can thus be made whose dimensions can be further controlled by machining operations. The zinc-silica bodies are highly abrasion resistant making these materials highly desirable for such applications. The cast zinc-silica bodies can also be used as bearing plate material since they are hard, abrasion resistant, and possess a low coefficient of friction on steel. The coefficient of resistance varies with the amount of sodium in the mixture. By controlling the alkali content either positive or negative coefficients may be obtained.

The porous zinc-silica bodies can also be impregnated with various impregnants to give additional strength thereto. The temperature to which the bodies can be operated at, however, would be limited to the optimum temperature at which the impregnant could be operated. Inorganic impregnants such as zinc or aluminum phosphate are thus desirable. The conductivity of the zinc-silica structure is also independent of the impregnant permitting removal of the impregnant without adversely affecting the electrical properties or the independent physical strength.

If conducting structures are to be formed according to this invention with zinc as the silicophilic material, the amount of zinc used should be in excess of that which would normally combine with the amount of silica present to form zinc silicate. The conductivity can be controlled by the amount of zinc used in excess, but too much should not be used so that the resulting structure would have predominantly the properties of metallic zinc or that no structure could be formed on freezing. Generally the proportions of zinc which can be used to form conductive bodies are the same as those described in my copending application Serial No. 530,426, filed August 24, 1955, now United States Patent No. 2,891,228.

The following specific examples are illustrative of the practice of my invention.

The aqueous colloidal silica dispersions used in the following examples are referred to therein as Ludox colloidal silica. The Ludox colloidal silica used was composed of 29 to 31 percent $SiO_2$, 0.29 to 0.39 percent $Na_2O$, a maximum of 0.15 percent sulfate as $Na_2SO_4$, and the remainder water. The particle size of the silica particles ranged from about 0.01 to 0.03 micron.

*Example I*

A mixture of 30 grams of mica flakes (commonly referred to as mica powder), 100 grams of water, and 150 grams of an aqueous colloidal solution of Ludox silica was thoroughly dispersed and mixed in a Waring Blendor. The resulting aqueous dispersion was then poured onto a ½ inch thick aluminum freezing plate which had previously been cooled to a temperature of about —5° C. The freezing temperature of the mica-silica dispersion was about 0° C. The dispersion was poured onto the cold plate to a thickness of less than about ⅛ inch. The dispersion froze almost immediately upon being poured onto the cold plate. The frozen dispersion was then stored at —5° C. until the dispersion itself was cooled to that temperature. The resulting frozen ice-like cake was removed from the freezing plate, placed on absorbent towels, and permitted to thaw at room temperature. Upon thawing, the material retained a rigid structure similar to a sponge and contained water. The water was drained from the structure and the remaining water removed by evaporation.

The resulting structure was a porous, dimensionally stable, mica-silica body having low thermal conductivity, low density, and good physical strength at temperatures ranging up to 2800° F.

The thermal conductivity ($k$) equaled approximately 1.0 B.t.u./(hr.) (sq. ft.) (° F./ft.) at a mean temperature of 1200° F. The body had a density equal to 19 pounds per cubic foot, a compression strength of 250 pounds per square inch at 100° F., and a compression strength of 260 pounds per square inch at 500° F.

The mica-silica body so produced was unlike any other foam or porous inorganic material commonly used as refractories. A mold of the mica-silica was unusually stable to dimensional changes during the drying stage and even during subsequent heating to 2500° F. The mica-silica body contained substantially no impurities.

The mica-silica body formed according to this example had a compression strength which remained substantially constant between room temperature and 500° F. At 500° F. the mica-silica body had a compression strength of about 2½ times as great as that of silicone resin foam, and as the temperature is raised the disparity between the compression strength of the silicone resin foam and the mica-silica body increased rapidly. The mica-silica body also possessed resiliency due to the flexibility of the mica flakes from which it was made.

*Example II*

A viscous dispersion or slurry of 30 grams of mica powder and 60 grams of an aqueous colloidal dispersion of Ludox silica was prepared by mixing in a Waring Blendor until they were thoroughly dispersed and then spread between 2 layers of a glass mat to a thickness of about 1/16 inch. This structure was quickly frozen by subjecting it to a temperature of approximately —20° C. until the aqueous slurry was completely frozen between the mats. The resulting structure was then thawed and dried. The dried mica-silica glass mat structure formed a rigid, stable, abrasion-resistant, porous structure having very fine pores and low electrolyte resistance. Since the intial continuous phase of the dispersion was water and the porous body was formed from a continuous ice medium, the pores developed were all interconnecting. This continuous pore structure resulted in a minimum electrolyte resistance for any given pore size.

The pore volume and pore size of such mica-silica structures according to this example can be controlled most easily by the relative proportion of water in the original mixture and the rate of freezing. The structure produced according to this example is an advantageous battery separator and can be used in lead acid batteries. This structure can also be used as a special filtering material such as a cigarette filter, or as a filter for air conditioning. If the structure is to be used as a filter, the pressure drop and the filtering efficiency can also be controlled over a very wide range by varying the relative proportion of water in the original mixture and the rate of freezing.

*Example III*

A mica-silica dispersion was prepared according to Example I and cast into the sandwich layer of a high speed, high temperature radome for installation over the radar component of an aircraft. Because of its high compression strength at high temperatures and its transparency to high frequency radiation, the mica-silicon radome was not subject to thermal shock and was found to be particularly suitable for this use.

*Example IV*

A dispersion of 7 grams of Acheson graphite and 16 grams of an aqueous colloidal dispersion of Ludox silica was formed by thoroughly mixing them in a Waring Blendor. The dispersion was placed in an aluminum container having ½ inch walls and quickly frozen by subjecting it to a temperature of about —5° C. for about one minute by immersing the container in a Dry Ice-alcohol refrigerant until the dispersion was completely frozen and was brought down to —5° C. The cast dispersion was then removed from the container or mold, allowed to thaw at room temperature, the water removed therefrom, and dried with heat. The cast structure was in the form of a long solid cylinder.

The resulting porous silica-graphite structure was then impregnated with a dimethylpolysiloxane resin and cured. The impregnated cylinder was then sliced into thin wafers about 1/32 inch thick and with a diameter of ¾ inch.

The resulting wafers were very area-sensitive and made excellent substitutes for the carbon wafers in carbon-pile voltage regulators.

The resulting wafers possessed power-amplification properties, and consequently were useful as transistors. A wafer of the above material ½ inch in diameter and ⅛ inch thick was applied with electrodes so that one of the electrodes served as the common electrode and each of the others as the grid and plate respectively. The following table illustrates the power amplification of the particular wafer produced according to this invention.

| $E_g$ (volts) | $I_g$ (milliamps) | $E_p$ (volts) | $I_p$ (milliamps) |
|---|---|---|---|
| −4.5 | 1.5 | 22.5 | 0.0 |
| −5.0 | 1.8 | 7.5 | 15.0 |
| −5.5 | 2.2 | 1.5 | 21.0 |

*Example V*

A dispersion of 20 grams of zinc in 4 grams of an aqueous colloidal dispersion of Ludox silica was prepared by thoroughly mixing the ingredients in a Waring Blendor. The resulting slurry was then cast in a sheet on a nickel wire grid and quickly frozen by subjecting the composite structure to a temperature of about −20° C. until the dispersion was completely frozen and had reached the freezing temperature. The structure was then thawed at room temperature, the water removed, and dried with heat. The resulting zinc-silica wire grid structure was rigid and porous and non-conducting.

This rigid material was further impregnated with additional colloidal Ludox silica by soaking it therein. The silica impregnated zinc-silica body was again dried and fired at approximately 1000° F. until it was electrically conductive.

This porous conducting material was found to consist of continuous paths of zinc metal in a zinc silicate sponge since part of the zinc and silica had reacted with oxygen during the firing to form the zinc silicate and zinx oxide. The plate was immersed in an alkaline bath without disintegration even though the zinc itself is soluable in the environment. When the body was used as a plate for a silver-zinc battery cell, it functioned as a rechargeable zinc plate.

*Example VI*

A mixture of 150 grams of an aqueous colloidal solution of Ludox, 10 grams of mica flakes, 100 grams of water, and 20 grams of fused quartz was thoroughly dispersed and mixed in a Waring Blendor. The resulting aqueous dispersion was then frozen in the same manner as the dispersion in Example I.

The resulting structure was porous, dimensionally stable, and withstood temperatures above 3200° F.

This application is a continuation-in-part of my prior application Serial No. 650,071, filed April 2, 1957, now abandoned.

I claim:

1. The process of forming porous, connected, structural bodies which comprises freezing a freeze-sensitive, aqueous, silica dispersion and an inorganic silicophilic material of at least one member selected from the group consisting of mica, graphite, clay, molybdenum disulfide, and zinc in less than about one minute on a highly nucleated surface to form a frozen body, said mixed, aqueous dispersion containing a sufficient amount of total solids so that they will touch each other when forced together by the formation of ice during the freezing thereof, and thawing the frozen body in the absence of agitation, said aqueous dispersion containing a sufficient amount of silicophilic material to effect a strong bonding of the silica particles and the silicophilic material to form a connected, structural, porous body.

2. The process of claim 1 in which the thawed body is broken down into a paste form while it is still wet.

3. The process of claim 2 in which the paste is subsequently molded while wet and dried to form a connected, porous, structural body.

4. The process of claim 1 in which the freezing surface is a silicone surface.

5. The process of forming porous, mica-silica bodies which are dimensionally stable and possess dielectric properties which comprises freezing a mixture of a freeze-sensitive, aqueous, silica dispersion and mica particles in less than about one minute on a highly nucleated surface under conditions which prevent at least part of the mica flakes from being randomly distributed to form a frozen body and to coprecipitate the silica and mica, said aqueous dispersion containing a sufficient amount of total solids so that they will touch each other when forced together by the formation of ice during the freezing thereof, and thawing the frozen body in the absence of agitation, said aqueous dispersion containing a sufficient amount of mica to effect a strong bonding of the silica particles and the mica particles to form a connected, structural, porous body when thawed.

6. The process of forming porous, graphite-silica bodies which are dimensionally stable and possess conducting properties which comprises freezing a mixture of a freeze-sensitive, aqueous, silica dispersion and graphite particles in less than about one minute on a highly nucleated surface to form a frozen body and to coprecipitate the silica and graphite, said aqueous dispersion containing a sufficient amount of total solids so that they will touch each other when forced together by the formation of ice during the freezing thereof, and thawing the frozen body in the absence of agitation, said aqueous dispersion containing a sufficient amount of graphite to effect a strong bonding of the silica particles and the graphite particles to form a connected, structural, porous body when thawed and to render the body electrically conductive.

7. The process of forming porous, graphite-silica bodies which are dimensionally stable and possess conducting properties which comprises freezing a mixture of a freeze-sensitive, aqueous, silica dispersion and graphite particles in less than about one minute on a highly nucleated surface under conditions which prevent at least part of the graphite particles from being randomly distributed to form a frozen body and to coprecipitate the silica and graphite, said aqueous dispersion containing a sufficient amount of total solids so that they will touch each other when forced together by the formation of ice during the freezing thereof, and thawing the frozen body in the absence of agitation, said aqueous dispersion containing a sufficient amount of graphite to effect a strong bonding of the silica particles and the graphite particles to form a connected, structural, porous body when thawed and to render the body electrically conductive.

8. The process of forming porous, molybdenum disulfide-silica bodies which are dimensionaly stable and possess lubricating properties which comprises freezing a mixture of a freeze-sensitive, aqueous, silica dispersion and molybdenum disulfide particles in less than about one minute on a highly nucleated surface to form a frozen body and to coprecipitate the silica and molybdenum disulfide, said aqueous dispersion containing a sufficient amount of total solids so that they will touch each other when forced together by the formation of ice during the freezing thereof, and thawing the frozen body in the absence of agitation, said aqueous dispersion containing a sufficient amount of molybdenum disulfide to effect a strong bonding of the silica particles and the molybdenum disulfide particles to form a connected, structural, porous body when thawed and to impart to the porous body lubricating properties.

9. The process of forming conductive, porous, zinc-silica bodies which comprises freezing a mixture of a freeze-sensitive, aqueous, silica dispersion and finely divided metallic zinc in less than about one minute on a highly nucleated surface to form a frozen body, said mixed, acqueous dispersion containing a sufficient amount of total solids so that they will touch each other when forced together by the formation of ice during the freezing thereof, thawing the frozen body to form a connected, structural, porous body, said aqueous dispersion containing a sufficient amount of finely divided metallic zinc to effect a strong bonding of the silica particles and the zinc to form a connected, structural, porous body when thawed and in excess of that which can chemically combine with the silica present to form zinc silicate, drying the porous body, and heating the porous body at a temperature of about 1,000° F. to render it conductive.

10. The porous, connected, structural body produced according to the process of claim 5.

11. The porous, connected, structural body produced according to the process of claim 6.

12. The porous, connected, structural body produced according to the process of claim 7.

13. The porous, connected, structural body produced according to the process of claim 8.

14. The porous, connected, structural body produced according to the process of claim 9.

References Cited in the file of this patent
UNITED STATES PATENTS 2,649,388     Wills et al. _____ Aug. 18, 1953